(12) United States Patent
Wang et al.

(10) Patent No.: US 7,728,705 B2
(45) Date of Patent: Jun. 1, 2010

(54) ELECTROMAGNETIC TRANSMISSION DEVICE

(75) Inventors: Yung-Hsing Wang, Taichung (TW);
Meng-Che Tsai, Kaohsiung (TW);
Yu-Hsiu Chang, Changhua County (TW); Ji-Bin Horng, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 412 days.

(21) Appl. No.: 11/868,440

(22) Filed: Oct. 5, 2007

(65) Prior Publication Data

US 2009/0045896 A1 Feb. 19, 2009

(30) Foreign Application Priority Data

Aug. 13, 2007 (TW) .............................. 96129827 A

(51) Int. Cl.
*H01F 7/08* (2006.01)
*H01F 7/00* (2006.01)
*G02B 7/02* (2006.01)
*H02K 41/00* (2006.01)
*H02K 33/00* (2006.01)
*H02K 35/00* (2006.01)

(52) U.S. Cl. ........................ 335/229; 335/220; 335/222; 335/302; 359/696; 359/703; 359/814; 359/824; 310/12; 310/13; 310/14; 310/15; 396/133; 396/508

(58) Field of Classification Search .................. 335/179, 335/220, 222, 229, 302; 359/198, 200, 696, 359/697, 703, 707, 813–814, 821–824; 369/44.18, 369/44.19, 44.21; 310/12, 13, 14, 15, 36, 310/49 R; 396/133, 219, 257, 508
See application file for complete search history.

(56) References Cited

U.S. PATENT DOCUMENTS

| | | | | |
|---|---|---|---|---|
| 5,220,461 A | * | 6/1993 | Inoue et al. | 359/824 |
| 5,499,143 A | * | 3/1996 | Sakamoto et al. | 359/824 |
| 5,572,372 A | * | 11/1996 | Sekine et al. | 359/824 |
| 5,828,503 A | * | 10/1998 | Kaneda et al. | 359/824 |
| 6,856,469 B2 | | 2/2005 | Yoneyama et al. | |
| 7,612,957 B1 | * | 11/2009 | Wu et al. | 359/824 |
| 2006/0214520 A1 | * | 9/2006 | Tseng | 310/14 |
| 2007/0046109 A1 | * | 3/2007 | Ho et al. | 310/12 |
| 2008/0284255 A1 | * | 11/2008 | Liu et al. | 310/12 |

FOREIGN PATENT DOCUMENTS

JP 2005-128405 5/2005

* cited by examiner

*Primary Examiner*—Lincoln Donovan
*Assistant Examiner*—Mohamad A Musleh
(74) *Attorney, Agent, or Firm*—Quintero Law Office

(57) ABSTRACT

An electromagnetic transmission device. A guide bar connects to a fixed base and includes magnetic-permeable material and a first central height plane. A coil connects to the fixed base. A support base movably fits on the guide bar. An annular magnetic member connects to the support base and is surrounded by the coil. A magnetization direction of the annular magnetic member is perpendicular to a moving direction of the support base and annular magnetic member. The annular magnetic member includes a second central height plane. The coil interacts with the annular magnetic member to generate a first force. When moving to separate the second central height plane from the first central height plane, the annular magnetic member interacts with the guide bar to generate a second force, driving the support base and annular magnetic member to move along a direction perpendicular to the magnetization direction of the annular magnetic member.

11 Claims, 8 Drawing Sheets

ELECTROMAGNETIC TRANSMISSION DEVICE

BACKGROUND OF THE INVENTION

1. Field of the Invention

The invention relates to electromagnetic transmission devices, and more particularly to electromagnetic transmission devices with reduced electrical power consumption.

2. Description of the Related Art

Microminiature image capturing devices are commonly applied in cellular phones, computers, vehicle radars, video game players, and medical inspection devices, etc. The microminiature image capturing devices have been developed to provide high definition quality, reduced power consumption, low manufacturing costs, and reduced size. As such, actuators disposed in the microminiature image capturing devices, for moving lens modules thereof, are critical.

Automatic displacement driving devices applied in lens modules may employ drivers providing rotational power with a rotational axis thereof paralleling an optical axis of the lens modules or drivers providing movement power with a moving direction thereof paralleling the optical axis of the lens modules.

An example of a driver providing rotational power with a rotational axis thereof paralleling an optical axis of a lens module is a stepping motor. The driver requires additional transmission-conversion mechanisms to enable the lens module to move along the optical axis. When the lens module arrives at a final position, no electricity is required to maintain the lens module therein. However, the driver has many components. Thus, the structure of the driver is complicated, and the size thereof cannot be reduced.

An example of a driver providing movement power with a moving direction thereof paralleling an optical axis of a lens module is a voice coil motor, a piezoelectric actuator, or a liquid lens actuator. The driver directly adjusts the position of the lens module. Compared with the driver providing rotational power, this driver has fewer components and is small. Nevertheless, there is a need to further reduce the size, manufacturing costs, and power consumption of this driver.

Referring to FIG. 1, U.S. Pat. No. 6,856,469 discloses a conventional lens drive device with a magnetic member 9, a spacer member 12, and a spring member 50 arranged parallel to an optical axis of a lens 2. The lens 2 is retained at retaining positions by magnetic attraction between a drive magnet 6 and the magnetic member 9 and by the spring member 50. The magnetic member 9 requirement, however, increases the number of constituent elements of the lens drive device, such that manufacturing costs and overall size of the lens drive device cannot be reduced. Additionally, electrical power is required to retain the lens 2 at the retaining positions, and the relationship between the moving position of the drive magnet 6 and magnetic member 9 and the variation of magnetic force thereof is nonlinear. Accordingly, positioning control of the lens 2 in the conventional lens drive device is difficult.

Additionally, as shown in FIG. 2A and FIG. 2B, Japan Patent Publication No. 2005-128405 discloses a conventional lens drive device 1. An upper spring 9 and a lower spring 11 enable precise movement of a lens module (including a lens 20, an upper cover 24, a lower washer 17, a coil 15, and a lens supporting base 7) and reduce friction during movement thereof. The upper spring 9 and lower spring 11 may be regarded as extensions of the coil 15, serving as conductors at ends thereof. Grooves 37 on an upper frame 23 and ribs 31 on the lens supporting base 7 bear impact or vibration generated by contact between a moving assembly (including the lens 20, upper cover 24, lower washer 17, coil 15, and lens supporting base 7) and a stator (including the upper frame 23, a yoke 3, and a magnet 13), maintaining a deviation value of the moving assembly with respect to an optical axis within an acceptable range and preventing excessive rotation of the lens 20 from adversely affecting other mechanisms in the lens drive device 1. Specifically, the yoke 3 enhances overall permeability of the lens drive device 1, increasing a magnetic voice coil force for moving the lens module. The yoke 3, however, adversely affects reduction of manufacturing costs and overall size of the lens drive device 1.

Hence, there is a need for electromagnetic transmission devices with reduced electrical power consumption, size, and manufacturing costs.

BRIEF SUMMARY OF THE INVENTION

A detailed description is given in the following embodiments with reference to the accompanying drawings.

An exemplary embodiment of the invention provides an electromagnetic transmission device comprising a fixed base, at least one guide bar, a coil, a support base, an annular magnetic member, and a resilient member. The guide bar is connected to the fixed base and comprises magnetic-permeable material and a first central height plane. The coil is connected to the fixed base. The support base is movably fit on the guide bar. The annular magnetic member is connected to the support base and surrounded by the coil. A magnetization direction of the annular magnetic member is perpendicular to a moving direction of the support base and annular magnetic member. The annular magnetic member comprises a second central height plane. The first and second central height planes parallel the magnetization direction of the annular magnetic member. The coil interacts with the annular magnetic member to generate a first force, driving the support base and annular magnetic member to move along a direction perpendicular to the magnetization direction of the annular magnetic member. When moving to separate the second central height plane from the first central height plane, the annular magnetic member interacts with the guide bar to generate a second force. The direction of the second force is the same as that of the first force. The second force drives the support base and annular magnetic member to move along the direction perpendicular to the magnetization direction of the annular magnetic member. The resilient member connects the coil to the annular magnetic member, providing the support base and annular magnetic member with restoring resilience.

Another exemplary embodiment of the invention provides an electromagnetic transmission device comprising a fixed base, a magnetic-permeable member, a coil, a support base, an annular magnetic member, and a resilient member. The magnetic-permeable member is connected to the fixed base and comprises a first central height plane. The coil is connected to the fixed base. The support base is movably connected to the fixed base. The annular magnetic member is connected to the support base and surrounded by the coil. A magnetization direction of the annular magnetic member is perpendicular to a moving direction of the support base and annular magnetic member. The annular magnetic member comprises a second central height plane. The first and second central height planes parallel the magnetization direction of the annular magnetic member. The coil interacts with the annular magnetic member to generate a first force, driving the support base and annular magnetic member to move along a direction perpendicular to the magnetization direction of the annular magnetic member. When moving to separate the second central height plane from the first central height plane, the annular magnetic member interacts with the magnetic-permeable member to generate a second force. The direction of the second force is the same as that of the first force. The second force drives the support base and annular magnetic member to move along the direction perpendicular to the magnetization direction of the annular magnetic member. The resilient member connects the coil to the annular magnetic member, providing the support base and annular magnetic member with restoring resilience.

Yet another exemplary embodiment of the invention provides an electromagnetic transmission device comprising a fixed base, a support base, a magnetic-permeable member, a coil, an annular magnetic member, and a resilient member. The support base is movably connected to the fixed base. The magnetic-permeable member is connected to the support base and comprises a first central height plane. The coil is connected to the support base. The annular magnetic member is connected to the fixed base and surrounds the coil. A magnetization direction of the annular magnetic member is perpendicular to a moving direction of the support base, magnetic-permeable member, and coil. The annular magnetic member comprises a second central height plane. The first and second central height planes parallel the magnetization direction of the annular magnetic member. The coil interacts with the annular magnetic member to generate a first force, driving the support base, magnetic-permeable member, and coil to move along a direction perpendicular to the magnetization direction of the annular magnetic member. When moving to separate the first central height plane from the second central height plane, the magnetic-permeable member interacts with the annular magnetic member to generate a second force. The direction of the second force is the same as that of the first force. The second force drives the support base, magnetic-permeable member, and coil to move along the direction perpendicular to the magnetization direction of the annular magnetic member. The resilient member connects the fixed base to the support base, providing the support base with restoring resilience.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1:
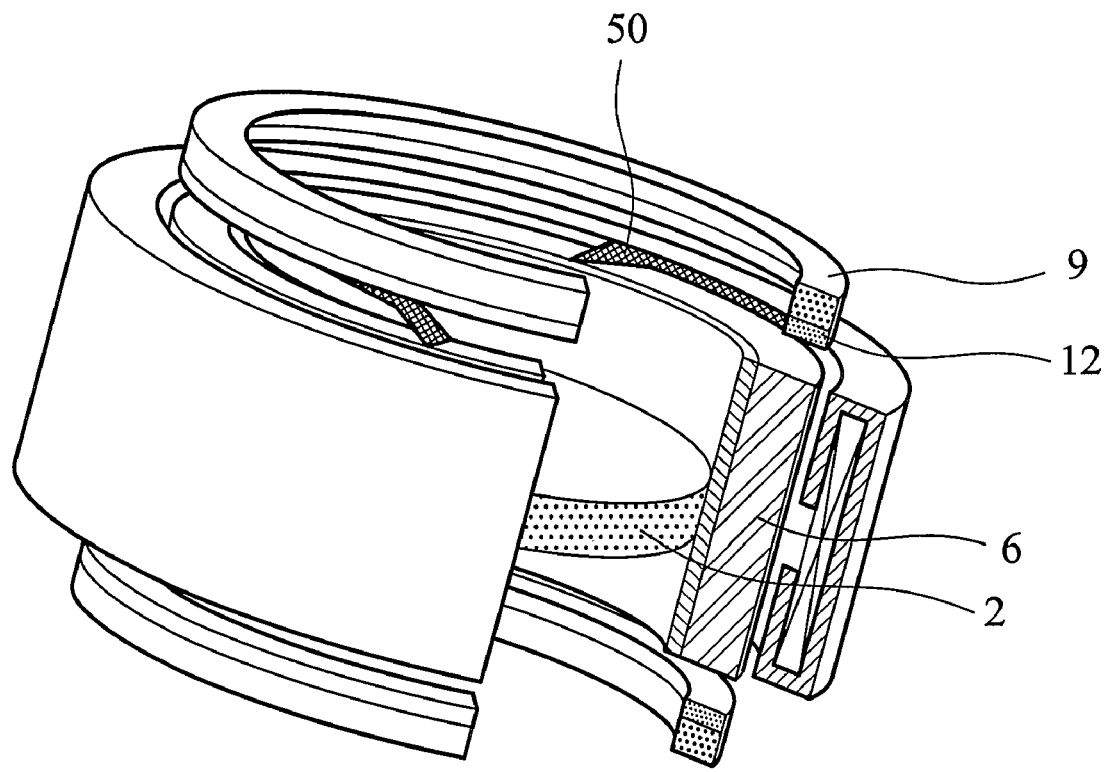
FIG. 1 is a partial perspective view of a conventional lens drive device.
Figure 2A:
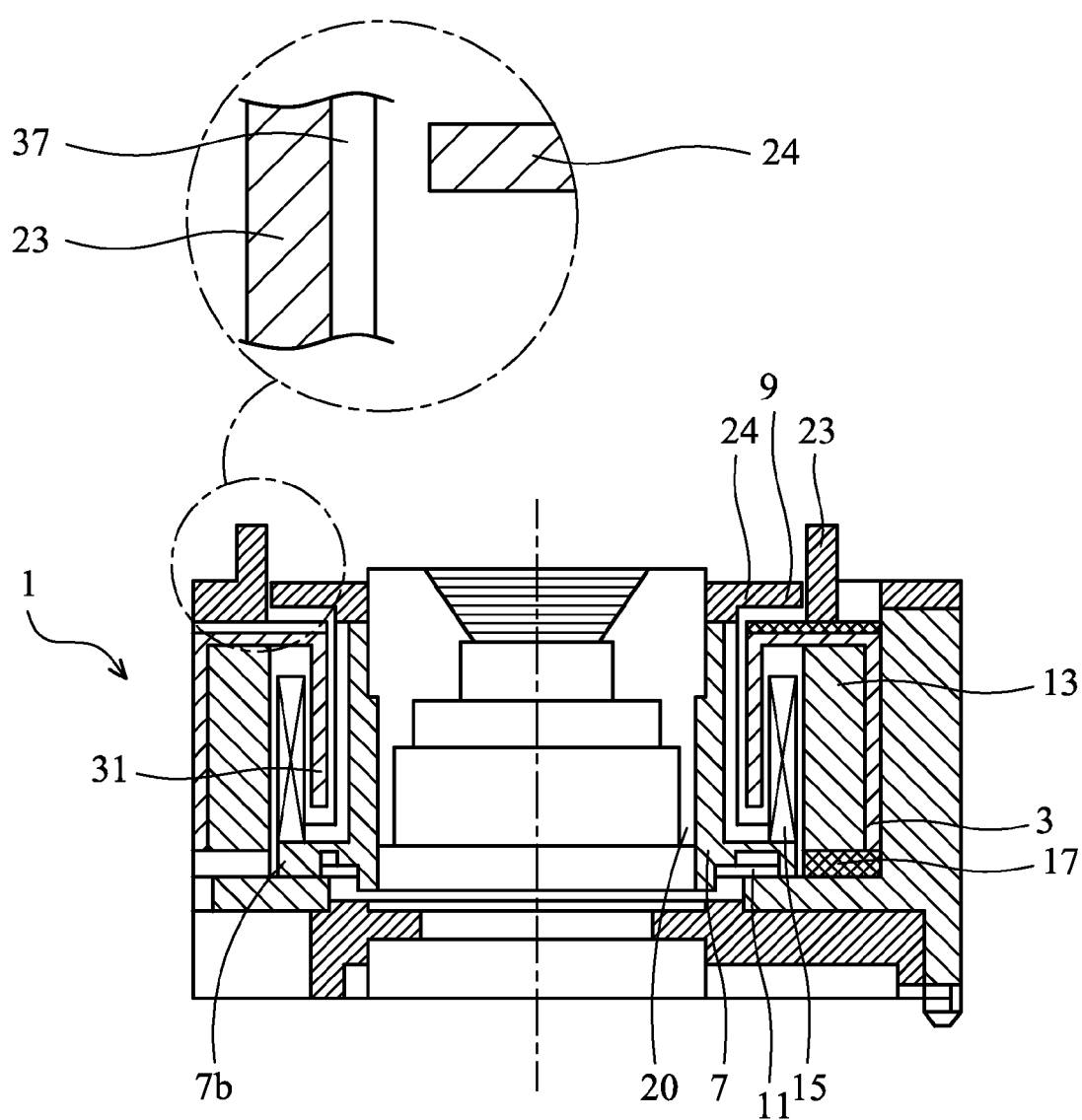
FIG. 2A is a schematic cross section of another conventional lens drive device.
Figure 2B:
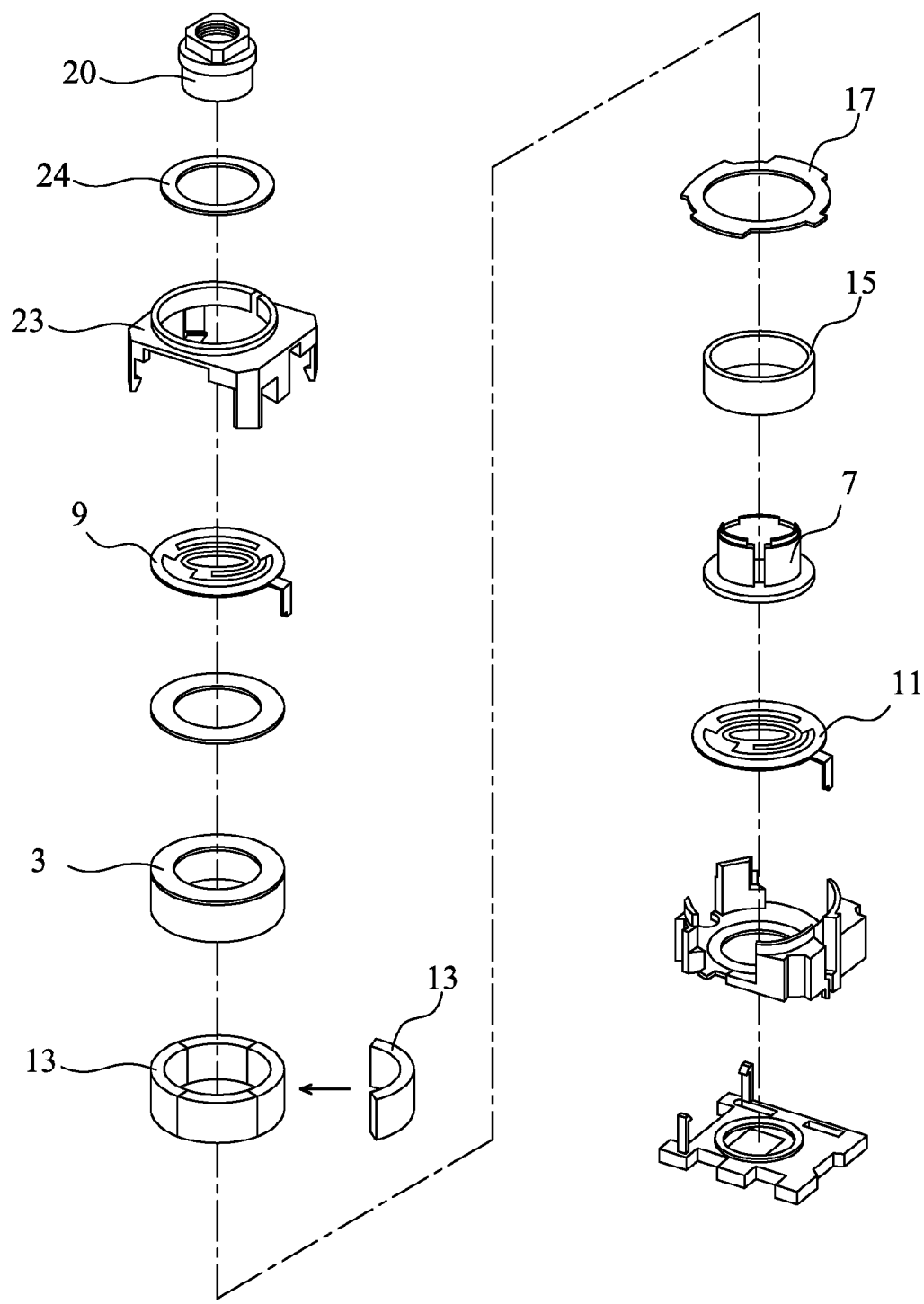
FIG. 2B is an exploded perspective view of the conventional lens drive device of FIG. 2A.
Figure 3:
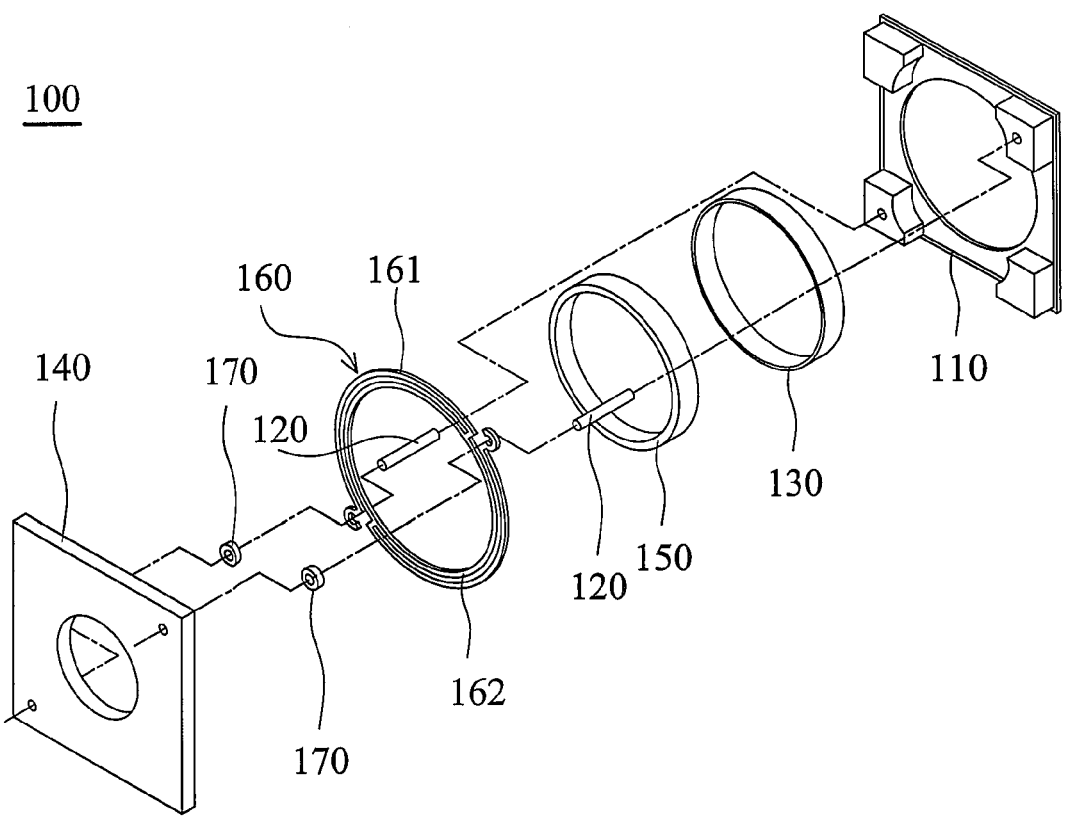
FIG. 3 is an exploded perspective view of an electromagnetic transmission device of a first embodiment of the invention.
Figure 4:
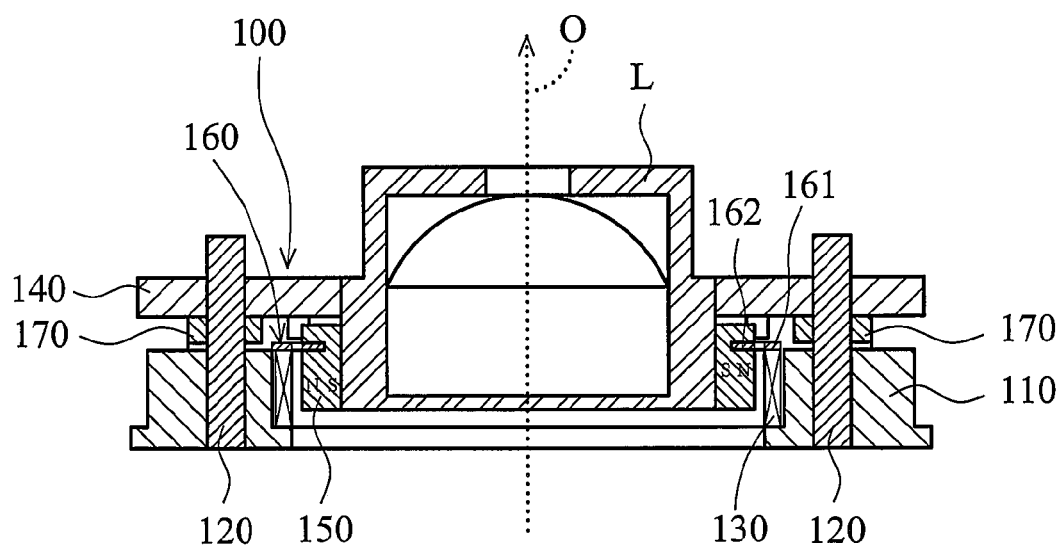
FIG. 4 is a schematic cross section of a lens module and the electromagnetic transmission device of the first embodiment of the invention.

Referring to FIG. 3 and FIG. 4, an electromagnetic transmission device 100 drives a lens module of a camera to move and comprises a fixed base 110, two opposite guide bars 120, a coil 130, a support base 140, an annular magnetic member 150, a resilient member 160, and two resilient rings 170. The fixed base 110, guide bars 120, coil 130, and resilient rings 170 may be regarded as fixed members of the electromagnetic transmission device 100, while the support base 140 and annular magnetic member 150 may be regarded as movable members thereof.

Figure 6:
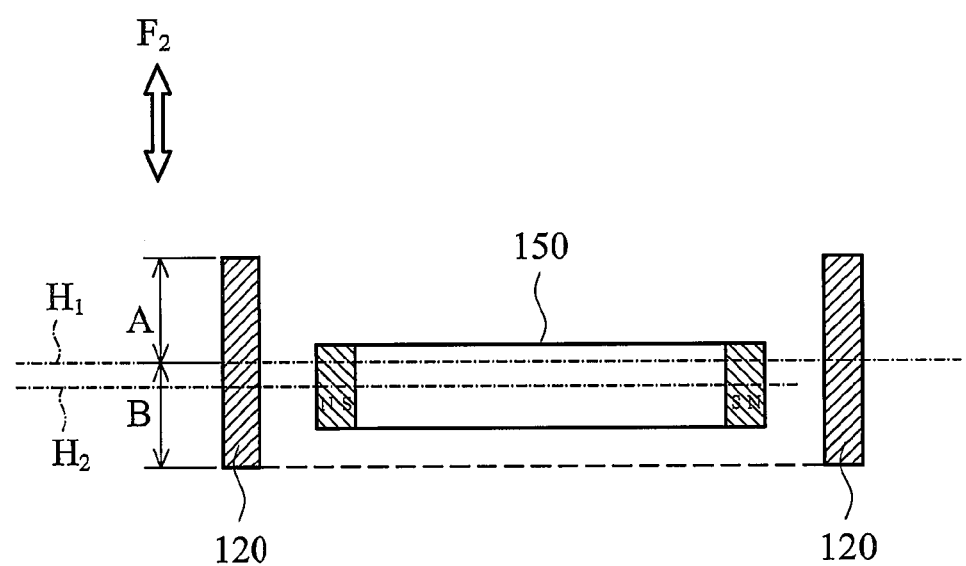
FIG. 6 is another schematic partial view of FIG. 4.

The guide bars 120 are connected to the fixed base 110. Here, the guide bars 120 comprise magnetic-permeable material (or one of the guide bars 120 comprises magnetic-permeable material). Additionally, as shown in FIG. 6, the guide bars 120 comprise a same first central height plane $H_1$.

As shown in FIG. 3 and FIG. 4, the coil 130 is connected to the fixed base 110.

The support base 140 is movably fit on the guide bars 120. As shown in FIG. 4, the support base 140 can support or carry a lens module L.

The annular magnetic member 150 is connected to the support base 140 and surrounded by the coil 130. Specifically, a magnetization direction of the annular magnetic member 150 is perpendicular to a moving direction of the support base 140 and annular magnetic member 150. Namely, the annular magnetic member 150 is radially magnetized, rather than axially magnetized. As the annular magnetic member 150 is radially magnetized, one magnetic pole (such as S pole) is on an inner circumference thereof while the other magnetic pole (such as N pole) is on an outer circumference thereof. Additionally, as shown in FIG. 6, the annular magnetic member 150 comprises a second central height plane $H_2$. The first central height plane $H_1$ of the guide bars 120 and the second central height plane $H_2$ of the annular magnetic member 150 parallel the magnetization direction of the annular magnetic member 150. In this embodiment, the annular magnetic member 150 may be a permanent magnet. Moreover, as being not easily magnetized radially to provide a saturated magnetic field, a small-size annular magnetic member 150 may be selectively replaced by multiple pieces of curved magnetic members. Namely, after being radially magnetized to respectively provide a saturated magnetic field, the multiple pieces of curved magnetic members are assembled to form the annular magnetic member 150. The assembled annular magnetic member 150 may thus be able to provide a saturated magnetic field.

As shown in FIG. 4, the resilient member 160 connects the coil 130 (fixed member) to the annular magnetic member 150 (movable member), providing the support base 140 and annular magnetic member 150 (both are movable members) with restoring resilience. Specifically, as shown in FIG. 3 and FIG. 4, the resilient member 160 comprises an outer ring portion 161 and an inner ring portion 162. The outer ring portion 161 is connected to the coil 130, and the inner ring portion 162 is connected to the annular magnetic member 150. Moreover, the resilient member 160 is not limited to being connected between the coil 130 and the annular magnetic member 150. Namely, the outer ring portion 161 may be selectively connected to the fixed base 110, guide bars 120, or resilient rings 170 of the fixed members, while the inner ring portion 162 may be selectively connected to the support base 140 of the movable members.

The resilient rings 170 are respectively fit on the guide bars 120 and disposed between the support base 140 and the fixed base 110, providing a cushioning effect between the support base 140 and the fixed base 110.

Figure 5:
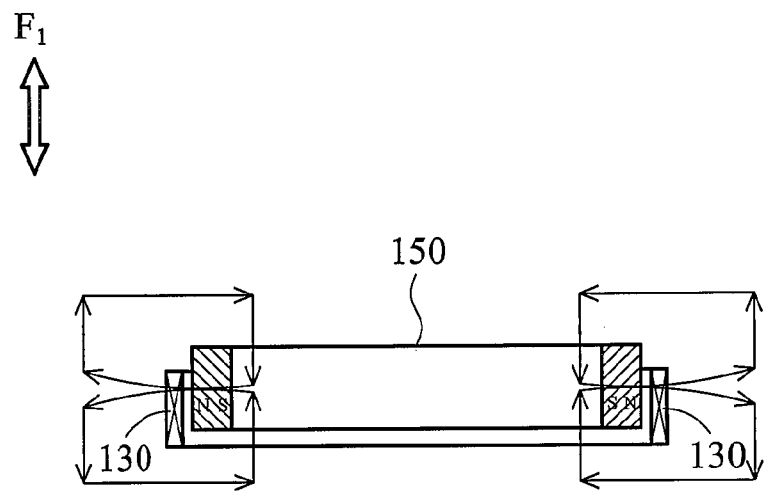
FIG. 5 is a schematic partial view of FIG. 4.

As shown in FIG. 5, the annular magnetic member 150 provides closed magnetic lines vertically passing through the coil 130. When being energized by application of a current, the coil 130 interacts with the magnetic lines provided by the annular magnetic member 150 to generate a first force $F_1$ according to the Lorentz's law. The first force $F_1$ drives the support base 140 and annular magnetic member 150 to move along a direction perpendicular to the magnetization direction of the annular magnetic member 150. In another aspect, during movement of the support base 140 and annular magnetic member 150, the resilient member 160 connecting the coil 130 to the annular magnetic member 150 provides the restoring resilience in which the direction is opposite to that of the first force $F_1$. By balance between the first force $F_1$ and the restoring resilience, the support base 140 supporting the lens module L can be positioned in specific positions.

As shown in FIG. 6, the guide bars 120 comprising magnetic-permeable material can be divided into two equal sections A and B by the first central height plane $H_1$ thereof. When the second central height plane $H_2$ of the annular magnetic member 150 aligns the first central height plane $H_1$ of the guide bars 120, the annular magnetic member 150 is subject to no axial magnetic attraction. When the second central height plane $H_2$ of the annular magnetic member 150 is located within the section A above the first central height plane $H_1$ of the guide bars 120, the radially magnetized annular magnetic member 150 is subject to an upward axial magnetic attraction force (a second force $F_2$) and pushed thereby. Here, as the magnetic lines guided into each guide bar 120 from the radially magnetized annular magnetic member 150 flow into or out of each guide bar 120 via two ends thereof and a reluctance between the annular magnetic member 150 and an open end of the section A of each guide bar 120 is less than that between the annular magnetic member 150 and an open end of the section B of each guide bar 120, the amount of the magnetic lines guided into the section A exceeds that guided into the section B, such that a magnetic attraction force between the annular magnetic member 150 and the section A of each guide bar 120 exceeds that between the annular magnetic member 150 and the section B thereof. Accordingly, because of the resultant of the two magnetic attraction forces, the annular magnetic member 150 is pushed by the upward axial magnetic attraction force (second force $F_2$). Based upon experimental and magnetic simulation results, when the second central height plane $H_2$ of the annular magnetic member 150 is located at the midpoint of the section A above the first central height plane $H_1$ of the guide bars 120, the annular magnetic member 150 is subject to a maximum upward axial magnetic attraction force (second force $F_2$). When the second central height plane $H_2$ of the annular magnetic member 150 is located at the open end of the section A above the first central height plane $H_1$ of the guide bars 120, the annular magnetic member 150 is subject to no axial magnetic attraction. On the other hand, when the second central height plane $H_2$ of the annular magnetic member 150 is located within the section B below the first central height plane $H_1$ of the guide bars 120, the annular magnetic member 150 is subject to a downward axial magnetic attraction force (second force $F_2$) and pushed thereby. Similarly, when the second central height plane $H_2$ of the annular magnetic member 150 is located at the midpoint of the section B below the first central height plane $H_1$ of the guide bars 120, the annular magnetic member 150 is subject to a maximum downward axial magnetic attraction force (second force $F_2$). When the second central height plane $H_2$ of the annular magnetic member 150 is located at the open end of the section B below the first central height plane $H_1$ of the guide bars 120, the annular magnetic member 150 is also subject to no axial magnetic attraction. Moreover, the direction of the axial magnetic attraction force (second force $F_2$) parallels that of the first force $F_1$.

Accordingly, to relatively upward move the annular magnetic member 150 in the section A of the guide bars 120, the second central height plane $H_2$ of the annular magnetic member 150 can be designed to be above the first central height plane $H_1$ of the guide bars 120. When upward moving along the direction perpendicular to the magnetization direction of the annular magnetic member 150, the support base 140 and annular magnetic member 150 are simultaneously subject to and pushed by the first force $F_1$ and second force $F_2$. Accordingly, the strength of the current applied in the coil 130 can be reduced, thus reducing electrical power consumption.

In this embodiment, the second central height plane $H_2$ of the annular magnetic member 150 is designed to substantially align the first central height plane $H_1$ of the guide bars 120. Accordingly, when the electromagnetic transmission device 100 is employed to drive a lens module L (as shown in FIG. 4) of a camera to move, the first force $F_1$ parallel to an optical axis O of the lens module L is generated according to the Lorentz's law, driving the lens module L, support base 140, and annular magnetic member 150 to move along the optical axis O (or the direction perpendicular to the magnetization direction of the annular magnetic member 150). Additionally, when moving to separate the second central height plane $H_2$ from the first central height plane $H_1$, the annular magnetic member 150 interacts with the guide bars 120 to generate a second force $F_2$ in which the direction is the same as that of the first force $F_1$, assisting in driving the lens module L, support base 140, and annular magnetic member 150 to move along the optical axis O (or the direction perpendicular to the magnetization direction of the annular magnetic member 150).

Moreover, when the application of the current in the coil 130 terminates, the first force $F_1$ vanishes. The lens module L, support base 140, and annular magnetic member 150 return to their original positions by the restoring resilience provided by the resilient member 160.

Second Embodiment

Elements corresponding to those in the first embodiment share the same reference numerals.

Figure 7:
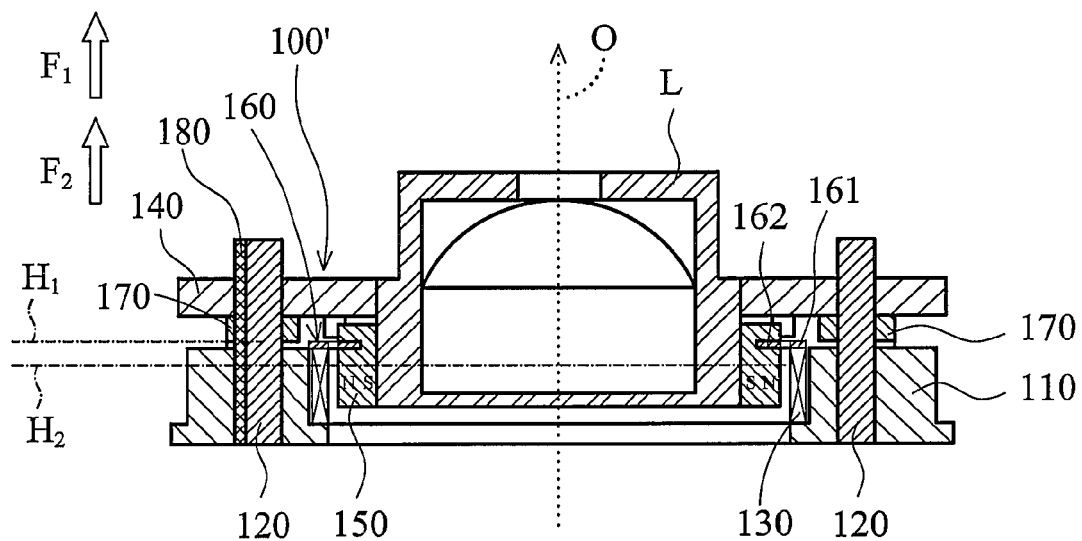
FIG. 7 is a schematic cross section of a lens module and an electromagnetic transmission device of a second embodiment of the invention.

Referring to FIG. 7, the difference between this and the first embodiments is that an electromagnetic transmission device 100' of this embodiment further comprises a magnetic-permeable member 180 and the guide bars 120 comprise non-magnetic-permeable material.

The magnetic-permeable member 180 is connected to the fixed base 110 and comprises a first central height plane $H_1$.

Structure, disposition, and function of other elements in this embodiment are the same as those in the first embodiment, and explanation thereof is omitted for brevity.

In this embodiment, the second central height plane $H_2$ of the annular magnetic member 150 is designed to substantially align the first central height plane $H_1$ of the magnetic-permeable member 180. Accordingly, when the electromagnetic transmission device 100' is employed to drive a lens module L (as shown in FIG. 7) of a camera to move, the first force $F_1$ parallel to an optical axis O of the lens module L is generated according to the Lorentz's law, driving the lens module L, support base 140, and annular magnetic member 150 to move along the optical axis O (or the direction perpendicular to the magnetization direction of the annular magnetic member 150). Additionally, when moving to separate the second central height plane $H_2$ from the first central height plane $H_1$, the annular magnetic member 150 interacts with the magnetic-permeable member 180 to generate a second force $F_2$ in which the direction is the same as that of the first force $F_1$, assisting in driving the lens module L, support base 140, and annular magnetic member 150 to move along the optical axis O (or the direction perpendicular to the magnetization direction of the annular magnetic member 150).

Similarly, when the application of the current in the coil 130 terminates, the first force $F_1$ vanishes. The lens module L, support base 140, and annular magnetic member 150 return to their original positions by the restoring resilience provided by the resilient member 160.

Third Embodiment

Figure 8:
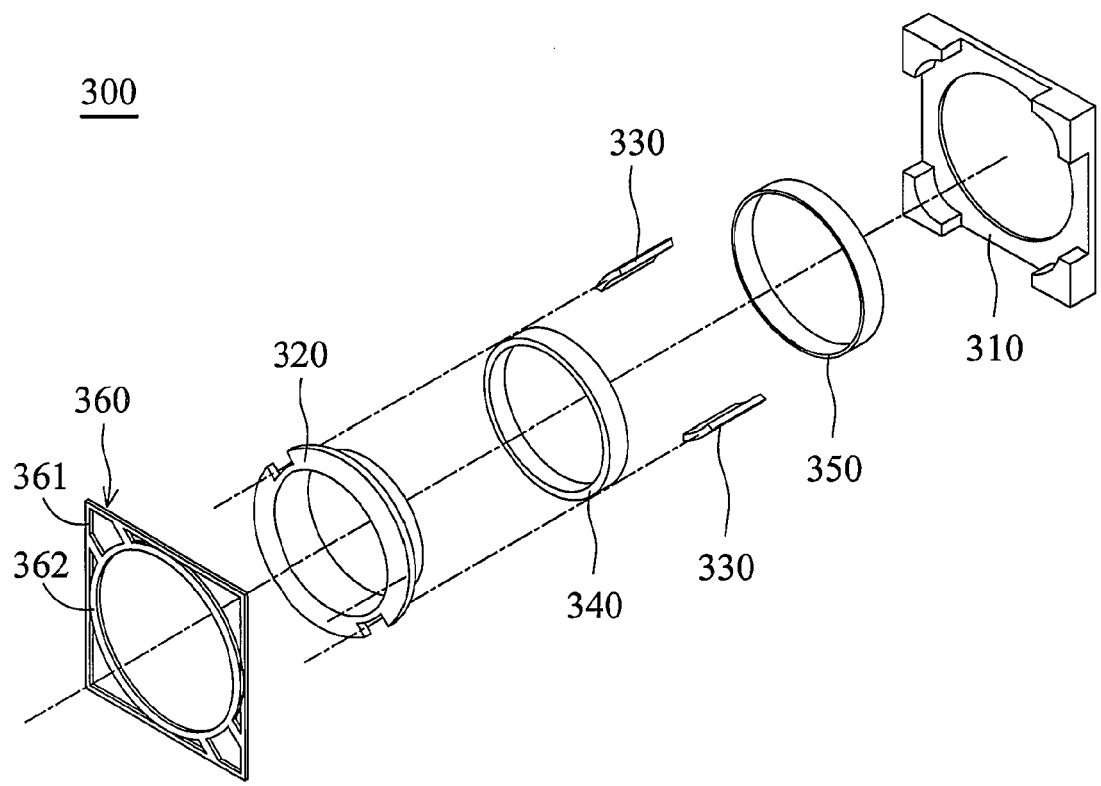
FIG. 8 is an exploded perspective view of an electromagnetic transmission device of a third embodiment of the invention.
Figure 9:
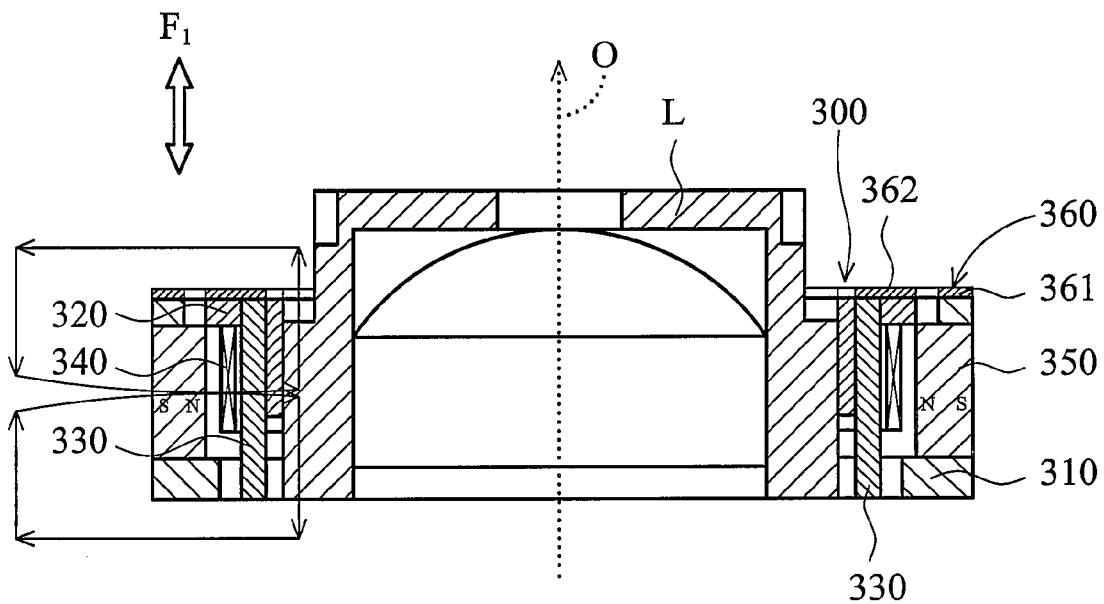
FIG. 9 is a schematic cross section of a lens module and the electromagnetic transmission device of the third embodiment of the invention.

Referring to FIG. 8 and FIG. 9, an electromagnetic transmission device 300 drives a lens module L of a camera to move and comprises a fixed base 310, a support base 320, two magnetic-permeable members 330, a coil 340, an annular magnetic member 350, and a resilient member 360. The fixed base 310 and annular magnetic member 350 may be regarded as fixed members of the electromagnetic transmission device 300, while the support base 320, magnetic-permeable members 330, and coil 340 may be regarded as movable members thereof.

The support base 320 is movably connected to the fixed base 310. As shown in FIG. 9, the support base 320 can support or carry the lens module L.

The magnetic-permeable members 330 are connected to the support base 320 and comprise a same first central height plane $H_1$.

The coil 340 is connected to the support base 320.

Figure 10:
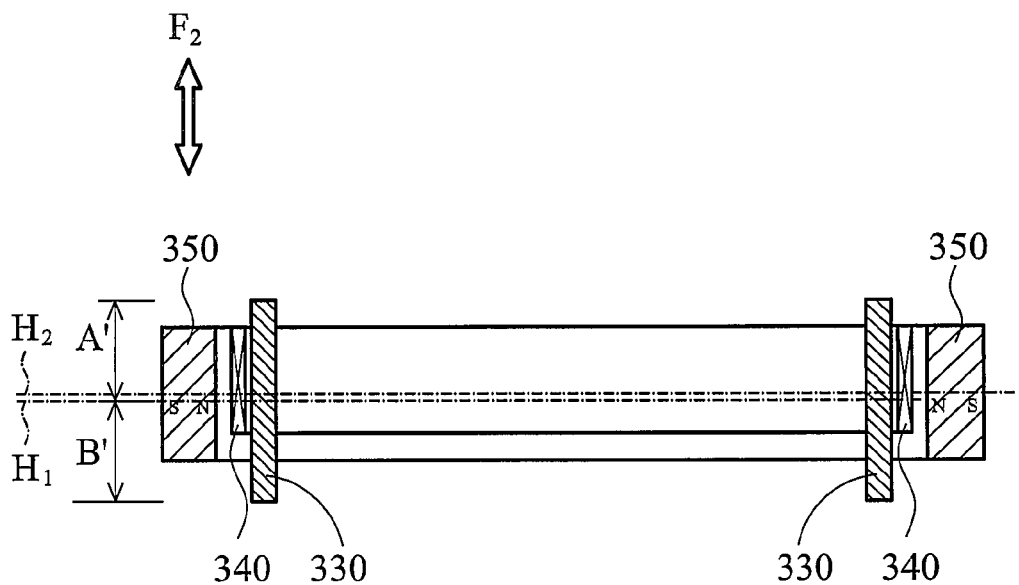
FIG. 10 is a schematic partial view of FIG. 9.

The annular magnetic member 350 is connected to the fixed base 310 and surrounds the coil 340. Specifically, a magnetization direction of the annular magnetic member 350 is perpendicular to a moving direction of the support base 320, magnetic-permeable members 330, and coil 340. Namely, the annular magnetic member 350 is radially magnetized, rather than axially magnetized. As the annular magnetic member 350 is radially magnetized, one magnetic pole (such as N pole) is on an inner circumference thereof while the other magnetic pole (such as S pole) is on an outer circumference thereof. Additionally, as shown in FIG. 10, the annular magnetic member 350 comprises a second central height plane $H_2$. The first central height plane $H_1$ of the magnetic-permeable members 330 and the second central height plane $H_2$ of the annular magnetic member 350 parallel the magnetization direction of the annular magnetic member 350. In this embodiment, the annular magnetic member 350 may be a permanent magnet. Similarly, as being not easily magnetized radially to provide a saturated magnetic field, a small-size annular magnetic member 350 may be selectively replaced by multiple pieces of curved magnetic members. Namely, after being radially magnetized to respectively provide a saturated magnetic field, the multiple pieces of curved magnetic members are assembled to form the annular magnetic member 350. The assembled annular magnetic member 350 may thus be able to provide a saturated magnetic field. Additionally, the coil 340 is disposed between the annular magnetic member 350 and the magnetic-permeable members 330.

As shown in FIG. 9, the resilient member 360 connects the fixed base 310 (fixed member) to the support base 320 (movable member), providing the support base 320 with restoring resilience. Specifically, as shown in FIG. 8 and FIG. 9, the resilient member 360 comprises an outer ring portion 361 and an inner ring portion 362. The outer ring portion 361 is connected to the fixed base 310, and the inner ring portion 362 is connected to the support base 320. Moreover, the resilient member 360 is not limited to being connected between the fixed base 310 and the support base 320. Namely, the outer ring portion 361 may be selectively connected to the annular magnetic member 350 of the fixed members, while the inner ring portion 362 may be selectively connected to the magnetic-permeable members 330 or coil 340 of the movable members.

As shown in FIG. 9, the annular magnetic member 350 provides closed magnetic lines vertically passing through the coil 340. When being energized by application of a current, the coil 340 interacts with the magnetic lines provided by the annular magnetic member 350 to generate a first force $F_1$ according to the Lorentz's law. The first force $F_1$ drives the support base 320, magnetic-permeable members 330, and coil 340 to move along a direction perpendicular to the magnetization direction of the annular magnetic member 350. In another aspect, during movement of the support base 320, magnetic-permeable members 330, and coil 340, the resilient member 360 connecting the fixed base 310 to the support base 320 provides the support base 320 with the restoring resilience in which the direction is opposite to that of the first force $F_1$. By balance between the first force $F_1$ and the restoring resilience, the support base 320 supporting the lens module L can be positioned in specific positions.

As shown in FIG. 10, the magnetic-permeable members 330 can be divided into two equal sections A' and B' by the first central height plane $H_1$ thereof. When the second central height plane $H_2$ of the annular magnetic member 350 aligns the first central height plane $H_1$ of the magnetic-permeable members 330, the magnetic-permeable members 330 are subject to no axial magnetic attraction. When the second central height plane $H_2$ of the annular magnetic member 350 is located within the section A' above the first central height plane $H_1$ of the magnetic-permeable members 330, the magnetic-permeable members 330 are subject to a downward axial magnetic attraction force (a second force $F_2$) and pushed thereby (because the annular magnetic member 350 is radially magnetized). Here, as the magnetic lines guided into each magnetic-permeable member 330 from the radially magnetized annular magnetic member 350 flow into or out of each magnetic-permeable member 330 via two ends thereof and a reluctance between the annular magnetic member 350 and an open end of the section A' of each magnetic-permeable member 330 is less than that between the annular magnetic member 350 and an open end of the section B' of each magnetic-permeable member 330, the amount of the magnetic lines guided into the section A' exceeds that guided into the section B', such that a magnetic attraction force between the annular magnetic member 350 and the section A' of each magnetic-permeable member 330 exceeds that between the annular magnetic member 350 and the section B' thereof. Accordingly, because of the resultant of the two magnetic attraction forces and the fixed annular magnetic member 350, the magnetic-permeable members 330 are pushed by the downward axial magnetic attraction force (second force $F_2$). Based upon experimental and magnetic simulation results, when the second central height plane $H_2$ of the annular magnetic member 350 is located at the midpoint of the section A' above the first central height plane $H_1$ of the magnetic-permeable members 330, the magnetic-permeable members 330 are subject to a maximum downward axial magnetic attraction force (second force $F_2$). When the second central height plane $H_2$ of the annular magnetic member 350 is located at the open end of the section A' above the first central height plane $H_1$ of the magnetic-permeable members 330, the magnetic-permeable members 330 are subject to no axial magnetic attraction. On the other hand, when the second central height plane $H_2$ of the annular magnetic member 350 is located within the section B' below the first central height plane $H_1$ of the magnetic-permeable members 330, the magnetic-permeable members 330 are subject to an upward axial magnetic attraction force (second force $F_2$) and pushed thereby. Similarly, when the second central height plane $H_2$ of the annular magnetic member 350 is located at the midpoint of the section B' below the first central height plane $H_1$ of the magnetic-permeable members 330, the magnetic-permeable members 330 are subject to a maximum upward axial magnetic attraction force (second force $F_2$). When the second central height plane $H_2$ of the annular magnetic member 350 is located at the open end of the section B' below the first central height plane $H_1$ of the magnetic-permeable members 330, the magnetic-permeable members 330 are also subject to no axial magnetic attraction. Moreover, the direction of the axial magnetic attraction force (second force $F_2$) parallels that of the first force $F_1$.

Accordingly, to relatively upward move the magnetic-permeable members 330 (or support base 320), the second central height plane $H_2$ of the annular magnetic member 350 can be designed to be below the first central height plane $H_1$ of the magnetic-permeable members 330. When upward moving along the direction perpendicular to the magnetization direction of the annular magnetic member 350, the support base 320, magnetic-permeable members 330, and coil 340 are simultaneously subject to and pushed by the first force $F_1$ and second force $F_2$. Accordingly, the strength of the current applied in the coil 340 can be reduced, thus reducing electrical power consumption.

In this embodiment, the second central height plane $H_2$ of the annular magnetic member 350 is designed to substantially align the first central height plane $H_1$ of the magnetic-permeable members 330. Accordingly, when the electromagnetic transmission device 300 is employed to drive the lens module L (as shown in FIG. 9) of a camera to move, the first force $F_1$ parallel to an optical axis O of the lens module L is generated according to the Lorentz's law, driving the lens module L, support base 320, magnetic-permeable members 330, and coil 340 to move along the optical axis O (or the direction perpendicular to the magnetization direction of the annular magnetic member 350). Additionally, when moving to separate the first central height plane $H_1$ from the second central height plane $H_2$, the magnetic-permeable members 330 interacts with the annular magnetic member 350 to generate a second force $F_2$ in which the direction is the same as that of the first force $F_1$, assisting in driving the lens module L, support base 320, magnetic-permeable members 330, and coil 340 to move along the optical axis O (or the direction perpendicular to the magnetization direction of the annular magnetic member 350).

Moreover, when the application of the current in the coil 340 terminates, the first force $F_1$ vanishes. The lens module L, support base 320, magnetic-permeable members 330, and coil 340 return to their original positions by the restoring resilience provided by the resilient member 360.

Figure 11:
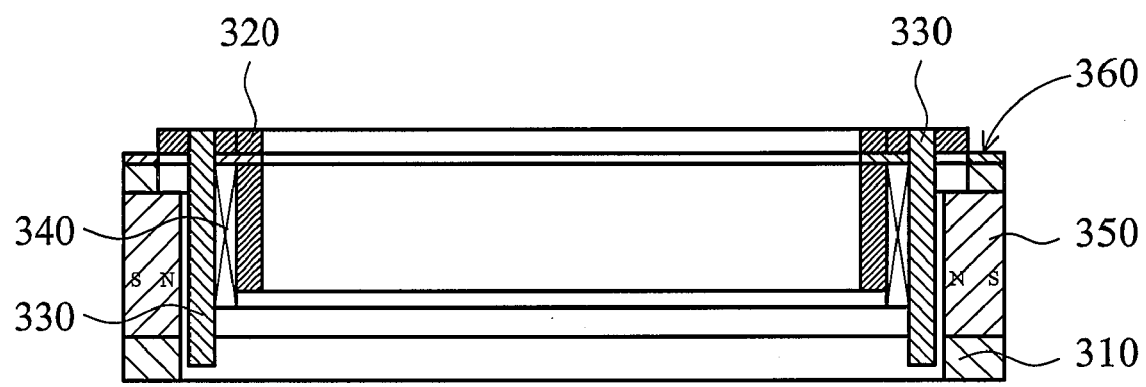
FIG. 11 is a schematic cross section of an electromagnetic transmission device of a fourth embodiment of the invention.

Additionally, although the coil 340 is disposed between the annular magnetic member 350 and the magnetic-permeable members 330, the relative position between the coil 340, annular magnetic member 350, magnetic-permeable members 330 may be altered. For example, as shown in FIG. 11, in an electromagnetic transmission device 300' (of a fourth embodiment), each magnetic-permeable member 330 is disposed between the annular magnetic member 350 and the coil 340. Operation and achieved functions of the electromagnetic transmission device 300' are the same as those of the electromagnetic transmission device 300.

Moreover, the electromagnetic transmission devices 300 and 300' may further comprise at least one guide bar (not shown) guiding the movable members (including the support base 320, magnetic-permeable members 330, and coil 340). For example, the guide bar is connected to the fixed base 310 and the support base 320 is movably fit on the guide bar. Additionally, the guide bar may comprise non-magnetic-permeable material.

In conclusion, as the disclosed electromagnetic transmission devices can additionally generate an axial magnetic attraction force (second force $F_2$) to assist in pushing or moving the support base supporting the lens module, the strength of the current applied in the coil is reduced. Electrical power consumption of the electromagnetic transmission devices is thus reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electromagnetic transmission device, comprising:
   a fixed base;
   at least one guide bar connected to the fixed base and comprising magnetic-permeable material and a first central height plane;
   a coil connected to the fixed base;
   a support base movably fit on the guide bar;
   an annular magnetic member connected to the support base and surrounded by the coil, wherein a magnetization direction of the annular magnetic member is perpendicular to a moving direction of the support base and annular magnetic member, the annular magnetic member comprises a second central height plane, the first and second central height planes parallel the magnetization direction of the annular magnetic member, the coil interacts with the annular magnetic member to generate a first force, driving the support base and annular magnetic member to move along a direction perpendicular to the magnetization direction of the annular magnetic member, when moving to separate the second central height plane from the first central height plane, the annular magnetic member interacts with the guide bar to generate a second force, the direction of the second force is the same as that of the first force, and the second force drives the support base and annular magnetic member to move along the direction perpendicular to the magnetization direction of the annular magnetic member; and a resilient member connecting the coil to the annular magnetic member, providing the support base and annular magnetic member with restoring resilience.

2. The electromagnetic transmission device as claimed in claim 1, further comprising at least one resilient ring fit on the guide bar and disposed between the support base and the fixed base.

3. An electromagnetic transmission device, comprising:

a fixed base;

a magnetic-permeable member connected to the fixed base and comprising a first central height plane;

a coil connected to the fixed base;

a support base movably connected to the fixed base;

an annular magnetic member connected to the support base and surrounded by the coil, wherein a magnetization direction of the annular magnetic member is perpendicular to a moving direction of the support base and annular magnetic member, the annular magnetic member comprises a second central height plane, the first and second central height planes parallel the magnetization direction of the annular magnetic member, the coil interacts with the annular magnetic member to generate a first force, driving the support base and annular magnetic member to move along a direction perpendicular to the magnetization direction of the annular magnetic member, when moving to separate the second central height plane from the first central height plane, the annular magnetic member interacts with the magnetic-permeable member to generate a second force, the direction of the second force is the same as that of the first force, and the second force drives the support base and annular magnetic member to move along the direction perpendicular to the magnetization direction of the annular magnetic member; and a resilient member connecting the coil to the annular magnetic member, providing the support base and annular magnetic member with restoring resilience.

4. The electromagnetic transmission device as claimed in claim 3, further comprising at least one guide bar connected to the fixed base, wherein the support base is movably fit on the guide bar.

5. The electromagnetic transmission device as claimed in claim 4, wherein the guide bar comprises non-magnetic-permeable material.

6. The electromagnetic transmission device as claimed in claim 4, further comprising at least one resilient ring fit on the guide bar and disposed between the support base and the fixed base.

7. An electromagnetic transmission device, comprising:

a fixed base;

a support base movably connected to the fixed base;

a magnetic-permeable member connected to the support base and comprising a first central height plane;

a coil connected to the support base;

an annular magnetic member connected to the fixed base and surrounding the coil, wherein a magnetization direction of the annular magnetic member is perpendicular to a moving direction of the support base, magnetic-permeable member, and coil, the annular magnetic member comprises a second central height plane, the first and second central height planes parallel the magnetization direction of the annular magnetic member, the coil interacts with the annular magnetic member to generate a first force, driving the support base, magnetic-permeable member, and coil to move along a direction perpendicular to the magnetization direction of the annular magnetic member, when moving to separate the first central height plane from the second central height plane, the magnetic-permeable member interacts with the annular magnetic member to generate a second force, the direction of the second force is the same as that of the first force, and the second force drives the support base, magnetic-permeable member, and coil to move along the direction perpendicular to the magnetization direction of the annular magnetic member; and a resilient member connecting the fixed base to the support base, providing the support base with restoring resilience.

8. The electromagnetic transmission device as claimed in claim 7, wherein the coil is disposed between the annular magnetic member and the magnetic-permeable member.

9. The electromagnetic transmission device as claimed in claim 7, wherein the magnetic-permeable member is disposed between the annular magnetic member and the coil.

10. The electromagnetic transmission device as claimed in claim 7, further comprising at least one guide bar connected to the fixed base, wherein the support base is movably fit on the guide bar.

11. The electromagnetic transmission device as claimed in claim 10, wherein the guide bar comprises non-magnetic-permeable material.

* * * * *